United States Patent
Philipzik et al.

(10) Patent No.: US 12,202,572 B2
(45) Date of Patent: Jan. 21, 2025

(54) HOLDING DEVICE FOR RELEASABLY HOLDING AN ACCUMULATOR AT A FRAME

(71) Applicant: Robert Bosch GmbH, Stuttgart (DE)

(72) Inventors: Fabian Philipzik, Tuebingen (DE); Peter Kunert, Lichtenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 335 days.

(21) Appl. No.: 17/635,072

(22) PCT Filed: Sep. 2, 2020

(86) PCT No.: PCT/EP2020/074415
§ 371 (c)(1),
(2) Date: Feb. 14, 2022

(87) PCT Pub. No.: WO2021/043795
PCT Pub. Date: Mar. 11, 2021

(65) Prior Publication Data
US 2022/0289336 A1    Sep. 15, 2022

(30) Foreign Application Priority Data
Sep. 4, 2019    (DE) ..................... 10 2019 213 435.1

(51) Int. Cl.
*B62M 6/90*    (2010.01)
*B62J 43/13*    (2020.01)
(Continued)

(52) U.S. Cl.
CPC ............. *B62M 6/90* (2013.01); *B62J 43/13* (2020.02); *B62J 43/20* (2020.02); *B62K 19/40* (2013.01); *B62H 5/001* (2013.01)

(58) Field of Classification Search
CPC ... B62M 6/90; B62J 43/20; B62J 43/13; B62J 43/28; B62K 19/40; B62H 5/001
See application file for complete search history.

(56) References Cited

U.S. PATENT DOCUMENTS 8,220,679 B2 * 7/2012 Yoshida .............. H01M 50/202
429/96
8,979,110 B2 * 3/2015 Talavasek ................ B62M 6/60
280/279
(Continued)

FOREIGN PATENT DOCUMENTS

CN    101837815 A    9/2010
CN    102849170 A    1/2013
(Continued)

OTHER PUBLICATIONS

International Search Report for PCT/EP2020/074415, Issued Dec. 8, 2020.

Primary Examiner — John D Walters
(74) Attorney, Agent, or Firm — NORTON ROSE FULBRIGHT US LLP; Gerard A. Messina

(57) ABSTRACT

A holding device for releasably holding an accumulator, in particular, a bicycle accumulator, at a frame, in particular, at a bicycle frame. The holding device includes at least one carrier unit for at least partially receiving and/or guiding the accumulator. The holding device also includes at least one locking unit situated at the carrier unit, in particular, at least mostly within the frame, for releasably, in particular, axially fixing the accumulator at the carrier unit on one side.

13 Claims, 6 Drawing Sheets

(51) Int. Cl.
*B62J 43/20* (2020.01)
*B62K 19/40* (2006.01)
*B62H 5/00* (2006.01)

(56) References Cited

U.S. PATENT DOCUMENTS

| | | |
|---|---|---|
| 9,399,499 B2 | 7/2016 | Honda et al. |
| 10,351,013 B2 * | 7/2019 | Shieh ................... B62M 6/40 |
| 11,024,917 B2 * | 6/2021 | Trif ...................... B62M 6/90 |
| 11,161,567 B2 * | 11/2021 | Eguchi ................ B62K 19/40 |
| 2008/0111344 A1 | 5/2008 | Chuang |
| 2012/0322321 A1 | 12/2012 | Kwag et al. |
| 2015/0114734 A1 | 4/2015 | Ogawa |
| 2015/0158551 A1 | 6/2015 | Ogawa |
| 2016/0056432 A1 | 2/2016 | Searles |
| 2018/0006278 A1 * | 1/2018 | Shimoda ............. H01M 50/202 |
| 2022/0081049 A1 * | 3/2022 | Schumacher .......... B62H 5/001 |

FOREIGN PATENT DOCUMENTS

| | | |
|---|---|---|
| DE | 202011003180 U1 | 5/2012 |
| DE | 102016001325 A1 | 9/2016 |
| DE | 202016104156 U1 | 9/2016 |
| DE | 102016213903 B3 | 1/2018 |
| DE | 102018006689 A1 | 2/2019 |
| DE | 102019104238 A1 | 8/2019 |
| EP | 1911666 A1 | 4/2008 |
| JP | H08207877 A | 8/1996 |
| JP | 2003182668 A | 7/2003 |

\* cited by examiner

HOLDING DEVICE FOR RELEASABLY HOLDING AN ACCUMULATOR AT A FRAME

BACKGROUND INFORMATION

A holding device for releasably holding an accumulator, in particular, a bicycle accumulator, at a frame, in particular at a bicycle frame, including at least one carrier unit for at least partially receiving and/or guiding the accumulator, is described in German Patent Application Nos. DE 10 2016 213 903 B3 and from DE 20 2016 104 156 U1.

SUMMARY

The present invention is directed to a holding device for releasably holding an accumulator, in particular, a bicycle accumulator, at a frame, in particular, at a bicycle frame, including at least one carrier unit for at least partially receiving and/or guiding the accumulator.

In accordance with an example embodiment of the present invention, it is provided that the holding device includes a locking element situated at the carrier element at least mostly within the frame for releasably fixing, in particular, axially, the accumulator at the carrier unit on one side. The design of the holding device according to an example embodiment of the present invention may advantageously enable a simple and/or secure mounting, dismounting and/or holding of an accumulator, in particular, of a bicycle accumulator, in particular, in and/or at a bicycle. A high degree of user-friendliness may be advantageously achieved by the releasable, in particular, axial, fixing on one side. Accumulators of different length may be held by the holding device.

The holding device is preferably designed as a bicycle accumulator holding device. The holding device is provided, in particular, to enable an at least temporary positioning of an accumulator in and/or at a bicycle. The accumulator is preferably designed as a bicycle accumulator. The accumulator is provided, in particular, to provide power for a drive unit of a bicycle, for example, of an auxiliary motor of an E-bike or of a Pedelec. The accumulator is, in particular, easily mountable or removable from the holding device, preferably without tools. The holding device is provided, in particular, to be fixed at a bicycle frame, preferably in a bicycle frame, for example, in an upper tube, a saddle tube, a control tube or preferably in a lower tube of the bicycle frame. For fixing in or at a bicycle frame, the holding device includes, in particular, fastening elements, for example, screw elements, plug elements or detent elements. Alternatively or in addition, it is possible that the holding device, preferably the carrier unit or the carrier element is designed at least partially as one piece with the bicycle frame, or at least a part of the holding device, preferably the carrier unit or the carrier element, is connected as one piece to the bicycle frame, for example, welded or bonded. "As one piece" is understood to mean, in particular, materially joined such as, for example, by a welding process and/or gluing process, etc., and particularly advantageously molded, such as produced from a cast and/or as produced in a single or multi-component injection process. "As one piece" is also advantageously understood to mean integrally. "Integrally" is understood to mean, in particular, formed in one piece. This one piece is manufactured preferably from a single blank, from a compound and/or from a cast, particularly preferably in an injection molding method, in particular, in a single and/or multicomponent injection molding method. "Intended" is understood to mean, in particular, specifically designed and/or specifically equipped. An object being intended for a particular function is understood to mean, in particular, that the object fulfills and/or carries out this particular function in at least one application state and/or operating state.

In accordance with an example embodiment of the present invention, the locking device includes, in particular, one first locking element and one second locking element corresponding to the first locking element. It is possible that the first locking element and the second locking element are movably, in particular, rotatably mounted on a base body of the locking unit. The first locking element preferably blocks a movement, in particular, a rotational movement, of the second locking element in a locking state. The holding device preferably includes an actuation unit, which is provided for an actuation of the locking unit by a user without tools. The actuation unit may, in particular, be designed as a mechanical or electrical switch. The actuation unit particularly preferably includes at least one support mechanism for protection against an unauthorized actuation of the locking element. The carrier unit is used, in particular, for stabilizing the holding device. A "fixing" is understood to mean, in particular, a positionally-fixed and/or rotationally-fixed connection. The locking unit is preferably provided to act on the accumulator merely on one side of the accumulator in a state in which the accumulator is situated at the carrier unit. The locking unit preferably includes a fixing side, at which all elements of the locking unit are situated, in order to fix the accumulator on one side. The accumulator is preferably fixed with the aid of the locking unit at no other side. The accumulator is, in particular, fixed, electrically contacted, locked and unlocked at one side with the aid of the locking unit. The accumulator is, in particular, axially fixed, electrically contacted, locked and unlocked at no other side with the aid of the locking unit.

In accordance with an example embodiment of the present invention, it is further provided that the locking unit is situated at at least one end of at least one carrier unit, a further end of the carrier element facing away from the locking unit being designed free of a, in particular, moveably mounted, locking element, of an, in particular, moveably mounted axial retaining element and/or of a stop element. A particularly simple design of the holding device may be advantageously implemented as a result. Accumulators of various lengths may be advantageously mounted. A particularly simple mounting, a particularly simple dismounting or a particularly simple change of the accumulator may be advantageously enabled. A particularly high degree of user-friendliness may be achieved by the embodiment according to the present invention. The holding device according to the present invention enables, in particular, a free movement of the locking unit, in particular, in a state not fixed at the carrier unit, along a longitudinal axis of the carrier element, since the carrier element is designed to move unrestricted along the longitudinal axis. The locking unit may be preferably completely separated from the carrier unit. At least the carrier element of the carrier unit preferably forms a guide bar, which is provided, in particular, to guide the accumulator during a mounting, in particular, during an insertion and/or during a dismounting, in particular, during a removal and, in the process, predefine, in particular, a movement axis. The guide bar may, in particular, at least be provided to predefine an orientation of the accumulator during an insertion of the accumulator into the holding device. This may advantageously avoid an incorrect mounting of and/or damage to the accumulator and/or to the holding device. It is possible that the accumulator and the guide bar have a fit to one another functioning according to the Poka Yoke principle. The carrier unit may, in particular, be formed from one or from multiple carrier elements. The carrier element is designed, in particular, as a bent sheet metal part, in particular, from an aluminum sheet or from a steel sheet. Alternatively, the carrier element may also be formed from a plastic or from a special material such as, for example, carbon. The carrier element is formed, in particular, from a single component. The carrier element and/or the accumulator preferably include(s) at least one slide element. This may advantageously prevent the accumulator and/or the carrier element from being damaged or scratched. At least one elongate element, for example, a cable, a tube, and/or a Bowden cable is advantageously guided past the carrier element along the longitudinal axis of the carrier element. The holding device, in particular, the carrier element, particularly advantageously includes at least one holder for the elongate element. A compactness, in particular, may be increased as a result. An "axial retaining element" is understood to mean, in particular, a component or an element, which restricts the movement of the accumulator relative to the carrier unit along a longitudinal axis of the carrier element or secures, fixes or locks the accumulator against a movement relative to the carrier unit along a longitudinal axis of the carrier element. The locking unit or the carrier unit preferably includes at least one stop element at least at the end of the carrier element at which the locking unit is situated. The stop element is connected to the carrier unit, in particular, to the carrier element of the carrier unit, in particular, in a force-fitting, form-fit and/or integral manner. The stop unit, in particular, limits a movement of the accumulator relative to the carrier unit at least in one mounting direction or insertion direction of the accumulator. The accumulator is preferably axially fixed or axially limited at no other side. In addition, it is provided that the holding device includes at least one support unit, which includes at least one support element situated at a, in particular, further end of a carrier element of the carrier unit facing away from the locking unit, and secures the accumulator at the carrier element in a state in which the accumulator is situated at the carrier element at least along a direction extending transversely to a longitudinal axis of the carrier element. In this way, a secure holding of the accumulator by the holding device may be advantageously implemented, in particular, without significantly affecting the user-friendliness. It is possible that the support unit secures the accumulator in a state situated at the carrier element at least along a further movement direction, in particular, in a direction transverse to a longitudinal axis of the carrier element. With the aid of the embodiment of the support unit of the holding device according to the present invention, it is possible to implement an operator-friendly one-sided releasable, in particular, axial fixing of the accumulator in the holding device. The support element may, in particular, form the entire support unit. The support element may, in particular, be designed as a detent element, a guide element, a clamping element or form-fit element. The support element is preferably provided to interact with corresponding support elements attached at the accumulator. The support element may advantageously have a shape tapering toward end areas of the support element as viewed along the longitudinal axis of the carrier element. It is possible that the support element has, for example, an essentially cuboidal, in particular, cubical shape. The support element having a form, which is "essentially" cuboidal, in particular, cubical, is understood in this context to mean, in particular, that a largest possible cuboid, in particular, a cube, which just fits into a spatial volume occupied by the support element, fills the spatial volume up to at least 70%, advantageously up to at least 80% and particularly advantageously up to 90%. It is also possible that the support element is designed as an, in particular, dovetail shaped, T-shaped, or double T-shaped undercut. The support element and/or the carrier element could, for example, be manufactured by a stamping method and/or by an embossing method and/or by a laser method, and/or by a water jet method and/or by a forging method and/or by an injection molding method and/or by a casting method, and/or by a machining method. The fastening elements of the holding device are provided, in particular, to fasten the support element. It would be possible that the support element is designed separately from the carrier element and is, in particular, releasably connected to the carrier element. For example, the support element could be glued and/or screwed and/or riveted to the carrier element. To achieve a simple and a cost-efficient manufacture of the holding device, the support element is preferably designed as one piece with the carrier element. The support unit may, in particular, include multiple support elements. The support elements of the support unit may preferably be situated at different positions, in particular at different distances, at the carrier element.

Furthermore, in accordance with an example embodiment of the present invention, it is provided that the holding device includes an electrical interface unit, which is situated at the carrier unit, in particular at the locking unit, particularly preferably at a base body of the locking unit, for electrically contacting the accumulator on one side. In this way, an operator-friendly holding device, in particular, having a simple design, may be advantageously provided. A high degree of mounting and dismounting convenience is particularly advantageously achieved by the embodiment according to the present invention. The at least one electrical interface unit is preferably designed at least partially as one piece with the locking unit. A space-saving and operator-friendly holding device may be advantageously achieved. The electrical interface unit is situated, in particular, at the fixing side of the locking unit. This allows the accumulator to be axially fixed, electrically contacted, locked and unlocked at merely one side.

In addition, in accordance with an example embodiment of the present invention, it is provided that the holding device includes at least one variation unit, which is provided to fix the locking unit at a carrier element of the carrier unit in a position-variable manner. A convenient operability of the holding device may be advantageously achieved. As a result of the design of the holding device according to the present invention, an adaptation of the holding device to the accumulator to be held may take place, in particular, with respect to a length of the accumulator. The variation unit is designed preferably as a detent unit, a clamping unit or a screwing unit. It is possible that in at least one embodiment, the variation unit is situated at least partially at the locking unit and/or at the carrier unit. It is possible that the variation unit is designed as a rail carriage. The rail carriage may, in particular, be moved relative to the carrier element along a longitudinal axis of the carrier element and may be guided at least partially by the carrier element. The rail carriage particularly preferably includes at least one spring-tensioned detent element. For example, the detent element is designed as a pin. It is also possible that the rail carriage includes a screwing element or a clamping element. The detent element of the rail carriage may, in particular, engage in corresponding detent recesses of the carrier element in particular positions of the carriage on the carrier element. The variation unit includes, in particular, an actuation unit, which is provided to release the rail carriage from a latched state upon actuation of the actuation unit. It is possible that the variation unit is able to fix the locking unit at the support elements of the support unit. It is also possible that the variation unit is able to fix the locking unit at the fastening elements of the holding device. In this way, a simple design of the holding device may be provided.

Furthermore, in accordance with an example embodiment of the present invention, it is provided that the locking unit includes at least one tensioning unit, which is provided to apply a tensioning force to the accumulator in a state situated at the locking unit in the direction of the locking unit. The tensioning force may advantageously largely prevent a slipping or a loosening of the accumulator, even in the event of strong vibrations. As a result of the tensioning force applied to the accumulator with the aid of the tensioning unit according to the present invention, a secure electrical contacting may be particularly advantageously provided, in particular, at the side of the accumulator at which the accumulator is fixed, in particular, axially at the carrier unit. The application of a tensioning force to the accumulator by the tensioning unit takes place, in particular, at the side of the accumulator, at which the accumulator is also axially fixed and electrically contacted. A pressure force, which the tensioning unit exerts on the accumulator in a state situated at the locking unit, is at least one-thirtieth, preferably at least one-tenth, advantageously at least one-fifth, preferably at least one and particularly preferably at least twofold of a weight force of the accumulator. The tensioning unit includes preferably at least one tensioning element, which is situated at the first locking element or at the second locking element and is connected, in particular, in a form-fit and/or force-fitting manner to the first locking element and/or to the second locking element. The tensioning unit may include, in particular, multiple tensioning elements. At least one tensioning element of the tensioning unit is advantageously situated at each of the first locking element and at the second locking element. One first tensioning element is preferably situated at the first locking element and one second tensioning element is situated at the second locking element. The first tensioning element and the second tensioning element and/or a further tensioning element of the tensioning unit may, in particular, be at least partially differently designed and/or situated in different ways at a locking element of the locking unit and/or be connected to a locking element of the locking unit. A tensioning force, with the aid of which the first locking element is pre-tensioned by the first tensioning element of the tensioning unit, may, in particular, differ from at least one further tensioning force, with the aid of which the second locking element is pre-tensioned by the second tensioning element of the tensioning unit and/or a further locking element is pre-tensioned with the aid of a further tensioning element, in particular with respect to an amount and/or with respect to a force application point and/or with respect to a direction, in which the tensioning force acts. A "tensioning element" is understood to mean, in particular, a macroscopic element, which has an extent that is elastically changeable in a normal operating state by at least 10%, in particular, by at least 20%, preferably by at least 30% and particularly advantageously by at least 50%, and which, in particular, generates a counterforce as a function of the change of the extent and preferably proportional to the change, which counteracts the change. An "extent" of an element is understood to mean, in particular, a maximum distance between two points of a perpendicular projection of the element onto a plane. A "macroscopic element" is understood to mean, in particular, an element having an extent of at least 1 mm, in particular, of at least 5 mm and preferably of at least 10 mm. A tensioning force exerted by a tensioning element of the tensioning unit is preferably due to the related counterforce generated during an elastic change of an extent of the tensioning element, and in particular, proportional to this counterforce. The first tensioning element, the second tensioning element and/or a further tensioning element of the tensioning unit is/are preferably designed as a spring, in particular, as a torsion spring and advantageously as a leg spring and/or rotary spring and is/are manufactured, in particular, from a metal and/or a metal alloy, preferably from a steel and particularly preferably from a spring steel. Alternatively, it is possible that the second tensioning element and/or a further tensioning element of the tensioning unit is/are designed also as an elastic element differing from a spring and/or manufactured from a plastic and/or from a composite material. It is also possible that the tensioning unit is provided to eject the accumulator with the aid of the tensioning force when the locking state is lifted. In this way, a convenient dismounting may be advantageously achieved to a high degree.

In addition, in accordance with an example embodiment of the present invention, it is provided that the locking unit includes at least one damping element for fixing the accumulator on one side without play, the damping element is situated, in particular, at a side of the locking unit facing the accumulator in a state in which the accumulator is situated at the locking unit. In this way, the accumulator may be advantageously protected even in the case of strong vibrations. A manufacturing-related and/or application-related freedom of movement of the accumulator within the holding device may be particularly advantageously minimized, as a result of which a slipping and or loosening of the accumulator may be largely prevented even in the case of strong vibrations. At least one tensioning element of the tensioning unit is preferably designed in such a way that it also functions as a damping element. Alternatively or in addition, it is possible that the locking unit includes one or multiple damping elements, which are designed differently and/or separately from a tensioning element of the tensioning unit. A damping element may, in particular, be designed as a spring, in particular, as a pressure spring, advantageously as a torsion spring and preferably as a leg spring and/or rotary spring. At least one damping element could alternatively or additionally be designed also as a pneumatic spring, for example, as a gas pressure spring. Furthermore, at least one damping element could also be designed as a rubber element, in particular, as a rubber pad and/or as a cushion element and/or as a foam element, in particular, as a plate made of a foam material, in particular, made of a polyurethane foam situated laterally at the locking unit and/or as another, in particular, elastic element having, in particular, material properties that are damping and suitable for play-free fixing made of a plastic and/or of a composite material and/or of another suitable material. The damping element of the locking unit is, in particular, situated at the fixing side of the locking unit, so that a one-sided, releasable, in particular, axial fixing of the accumulator at the carrier unit may be enabled.

Furthermore, in accordance with an example embodiment of the present invention, a frame, in particular, a bicycle frame, including at least one holding device according to the present invention is provided. The frame preferably includes at least one elongate element, the frame is particularly preferably completely formed from elongate elements. An "elongate element" is understood in this context to mean, in particular, an element in which the smallest possible cuboid, which is just able to receive the element, has a length that is at least five times, advantageously at least ten times and particularly preferably at least fifteen times a width and a height of the cuboid. The frame may include, in particular, at least one recess for receiving the holding device, in particular, the carrier element, and the energy store. The recess may, for example, be designed as an indentation or as a cavity in the frame. By at least partially arranging the holding device, in particular, the carrier element, within a cavity of the frame, it is possible to improve, in particular, an appearance of the frame in the state of the energy store in which it is situated at the carrier element, and/or to reduce a wall thickness of the frame and/or to prevent a penetration of contaminants and/or liquids into the energy store. The arrangement of the holding device and/or of the carrier element within the cavity is particularly advantageous in an embodiment of the frame as a lightweight frame, for example, a carbon frame.

In accordance with an example embodiment of the present invention, it is also provided that the frame includes at least one frame tube, in particular, a lower tube, in which the holding device is at least mostly situated. A particularly space-saving stowage of the accumulator may be advantageously achieved in this way. In addition, a stowage possibility may be advantageously created for an energy store that is particularly long and thus has a high energy store capacity. The accumulator is preferably inserted along its longitudinal axis into the frame element. The carrier element extends, in particular, in parallel to the frame element. During mounting, the accumulator is, in particular, inserted, guided along the carrier element until the accumulator meets the locking unit situated at the carrier unit. Alternatively, it is also possible, however, that the accumulator is introduced through a lateral opening of the frame element into the interior of the frame element.

The holding device according to the present invention and the frame according to the present invention are not restricted here to the above-described applications and specific embodiments. The holding device according to the present invention and/or the frame according to the present invention may, in particular, include a number differing from a number of individual elements, components and units cited herein for carrying out an operating mode described herein. In addition, in the case of the value ranges specified in this description, values falling within the cited limits are also to be considered disclosed and arbitrarily usable.

BRIEF DESCRIPTION OF THE DRAWINGS

Further advantages of the present invention result from the following description of the figures. An exemplary embodiment of the present invention is shown in the figures. The figures and the description disclose numerous features in combination. Those skilled in the art will also advantageously consider the features separately and combine them to form meaningful further combinations, in view of the disclosure herein.

DETAILED DESCRIPTION OF EXAMPLE EMBODIMENTS

Figure 1:
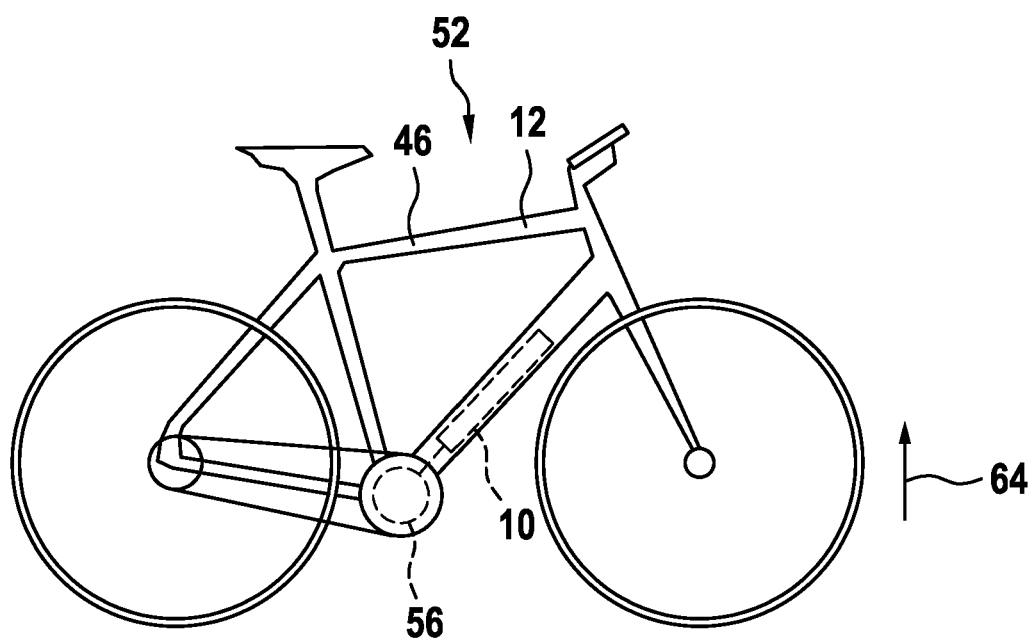
FIG. 1 schematically shows a representation of a bicycle including a frame according to an example embodiment of the present invention, in particular, a bicycle frame, in a side view.

FIG. 1 shows a bicycle 52 including an auxiliary motor 56 and including an accumulator 10. Bicycle 52 is designed as a Pedelec or as an E-bike. Accumulator 10 is provided to supply auxiliary motor 56 with electrical power. Bicycle 52 includes a frame unit 12 designed as bicycle frame 46.

Figure 2A:
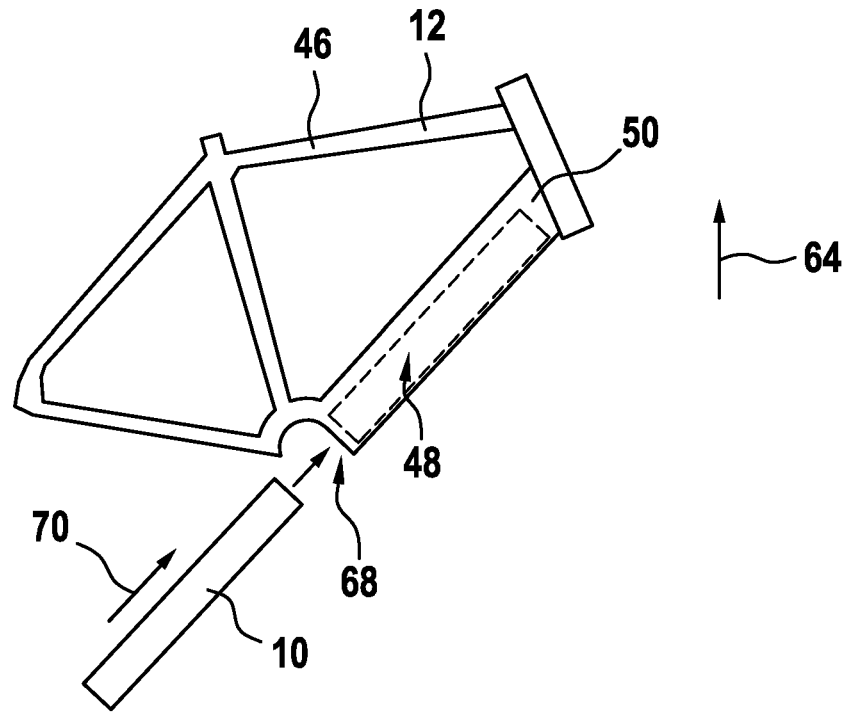
FIG. 2A schematically shows a representation of a first variant of the bicycle frame including a holding device according to the present invention and including an accumulator in a side view, in accordance with the present invention.
Figure 2B:
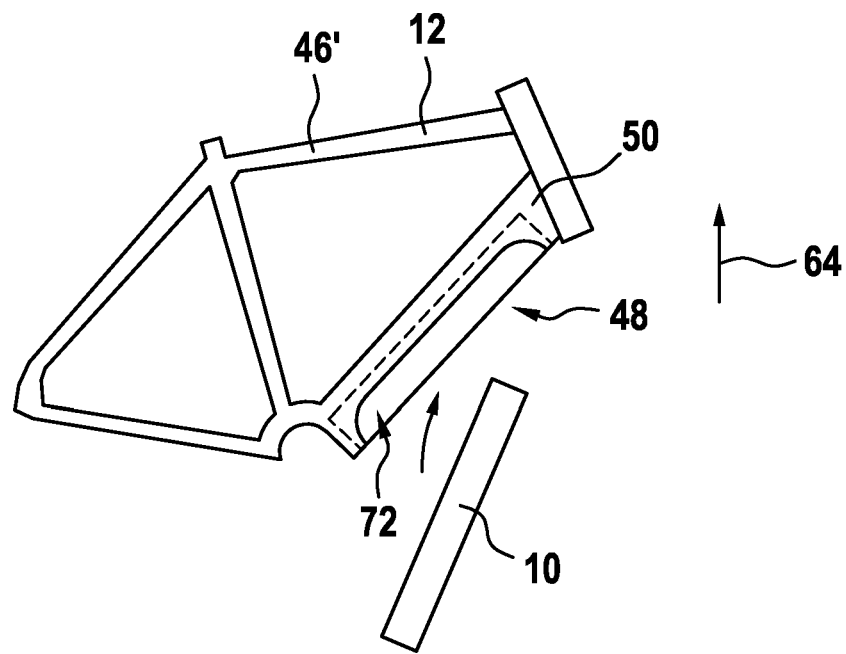
FIG. 2B schematically shows a representation of a second variant of the bicycle frame including the holding device according to the present invention and the accumulator in a side view, in accordance with the present invention.

FIGS. 2A and 2B show two variants of bicycle frame 46, 46'. Bicycle frame 46 includes a frame element 50. Frame element 50 has a tubular design. Frame element 50 of tubular design has a round cross section, but could alternatively also have an oval, an angular or a differently shaped cross section. Frame element 50 is designed as a lower tube of bicycle frame 46, 46'. Bicycle frame 46, 46' includes a holding device 48. Frame element 50 is provided to receive at least a major part of holding device 48 in its interior. Frame element 50 is provided to receive at least a major part of the accumulator 10 held with the aid of holding device 48 in its interior. In the exemplary embodiment of FIG. 2A, bicycle frame 46 includes an opening 68 at an underside of frame element 50. Accumulator 10 is inserted through opening 68 along a longitudinal axis 70 of accumulator 10 into the interior of frame element 50. In the alternative exemplary embodiment of FIG. 2B, bicycle frame 46' includes a lateral opening 72 at frame element 50. Accumulator 10 is inserted, in particular pivoted, through lateral opening 72 into the interior of frame element 50. Lateral opening 72 points essentially downward as viewed in a positioning direction 64 of bicycle 52.

Figure 3:
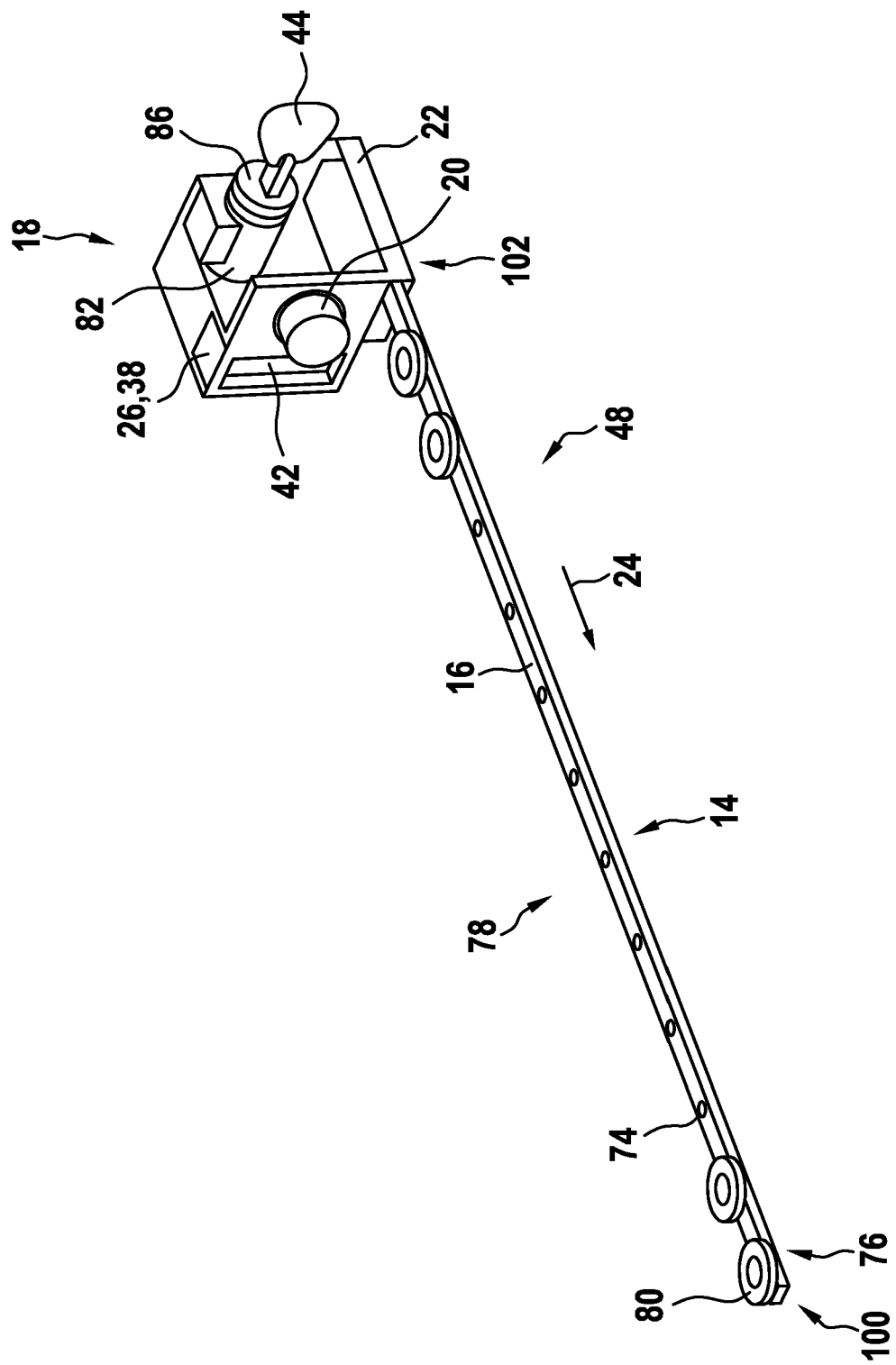
FIG. 3 schematically shows a representation of the holding device according to an example embodiment of the present invention.

FIG. 3 schematically shows a representation of holding device 48. Holding device 48 is provided for releasably holding accumulator 10 at bicycle frame 46. Holding device 48 includes a carrier unit 14. Carrier unit 14 includes a carrier element 16. Carrier element 16 is designed as a guide bar. Carrier element 16 has a longitudinal axis 24. Accumulator 10 is guided along longitudinal axis 24 by carrier element 16 designed as a guide bar. Carrier element 16 includes a receiving area 78 for accumulator 10. Accumulator 10 is situated, in particular, fixed in a mounted operating state of holding device 48 in receiving area 78 of carrier element 16. Carrier element 16 includes fastening elements 74. Fastening elements 74 are designed as recesses. Carrier element 16 is fixable onto bicycle frame 46 with the aid of fastening elements 74 and, for example, screws, rivets and the like.

Holding device 48 includes a support unit 76, which includes at least one support element 80, in particular, multiple support elements 80. Support elements 80 of support unit 76 are situated at carrier element 16, in particular, at the recesses of fastening elements 74 of carrier element 16. Support elements 80 are situated in a distributed manner along longitudinal axis 24 of carrier element 16. Support elements 80 are designed identically to one another, hence, only one of support elements 80 is described below. Support element 80 is designed as one piece with carrier element 16. Support element 80 secures accumulator 10 at carrier element 16 in a state of accumulator 10 in which it is situated at carrier element 16 along a direction extending transversely to longitudinal axis 24 of carrier element 16. Support element 80 has a tapering shape as viewed along longitudinal axis 24 of carrier element 16. Support element 80 has a circular shape as viewed perpendicularly to a main extension plane (not represented) of support element 80. Support element 80 may include, in particular, a slide element (not represented) for reducing friction during a guiding of accumulator 10 when situating accumulator 10 at carrier element 16.

Holding device 48 includes a locking unit 18. Locking unit 18 is situated at the carrier unit 14, in particular, at carrier element 16, in particular fixed thereto. Locking unit 18 is situated at one end 100 of carrier element 16 of carrier unit 14. A further end 102 of carrier element 16 is designed free of a locking element, of a transverse guide element and/or of a stop element. Holding device 48 includes an electrical interface unit 20. Electrical interface unit 20 is used to electrically contact accumulator 10 introduced into receiving area 78. Electrical interface unit 20 is situated on a side 42 of locking unit 18 facing receiving area 78. Electrical interface unit 20 is designed at least partially as one piece with locking unit 18. Holding device 48 includes a variation unit 22. Variation unit 22 is provided to fix locking unit 18 at carrier element 16 in a position-variable manner, in particular, at support elements 80. Locking unit 18 includes a tensioning unit 82, which is provided to apply a tensioning force to accumulator 10 in a state situated at locking unit 18 in the direction of locking unit 18. Locking unit 18 includes a damping element 84 for fixing accumulator 10 in a play-free manner. Damping element 84 is situated at side 42 of locking unit 18 facing accumulator 10 in a state in which accumulator 10 is situated at locking unit 18.

Locking unit 18 includes an actuation unit 26, including an actuation element 38, which is provided for the actuation of locking unit 18 by a user without tools. Locking unit 18 includes a lock 86. Lock 86 is provided to prevent an unauthorized actuation of actuation unit 26 of locking unit 18. In a locked state of lock 86, lock 86 blocks an actuation of actuation element 38. Lock 86 may be unlocked and/or locked with the aid of a key 44.

Figure 4:
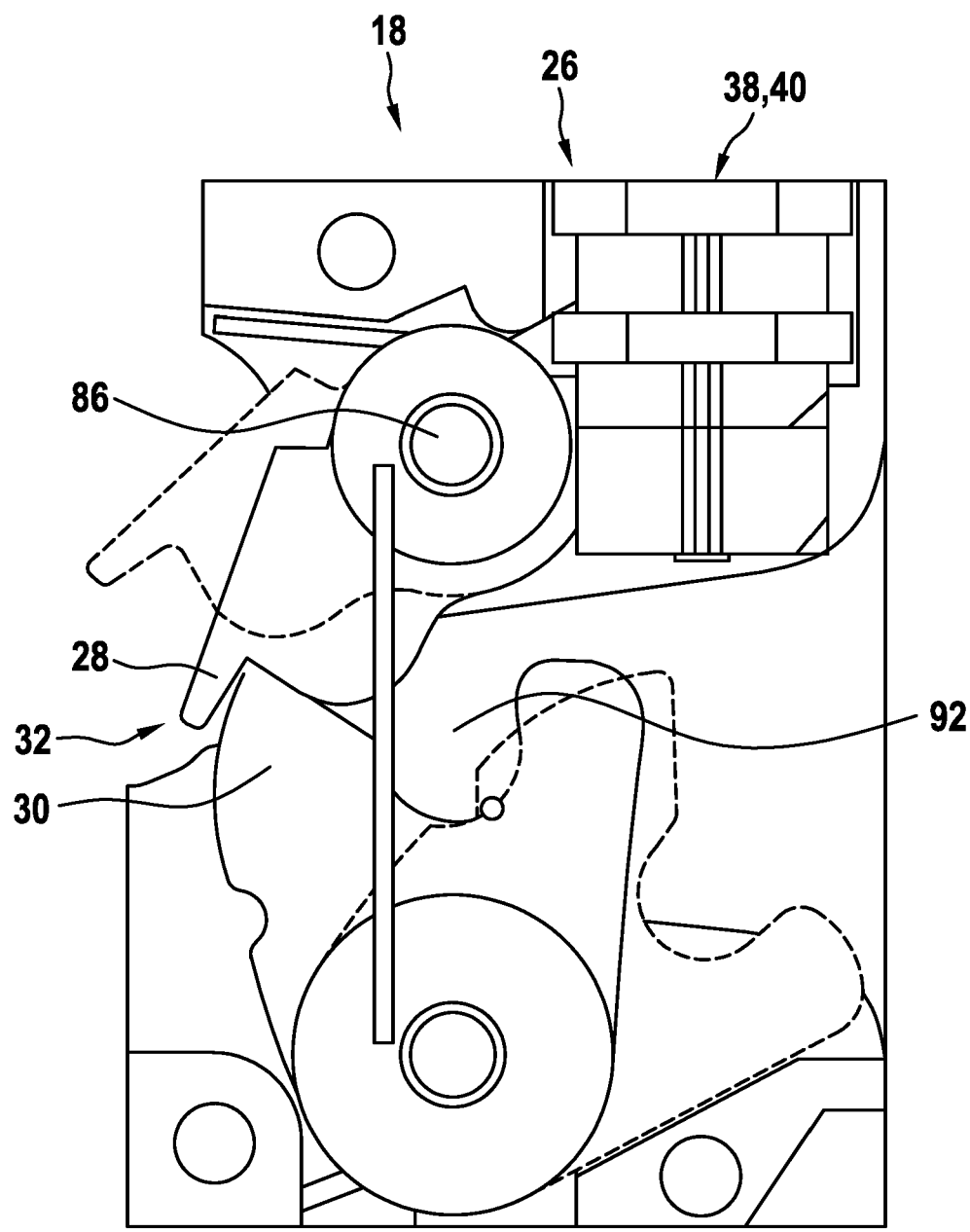
FIG. 4 schematically shows a representation of one part of a locking unit of the holding device according to an example embodiment of the present invention.
Figure 5:
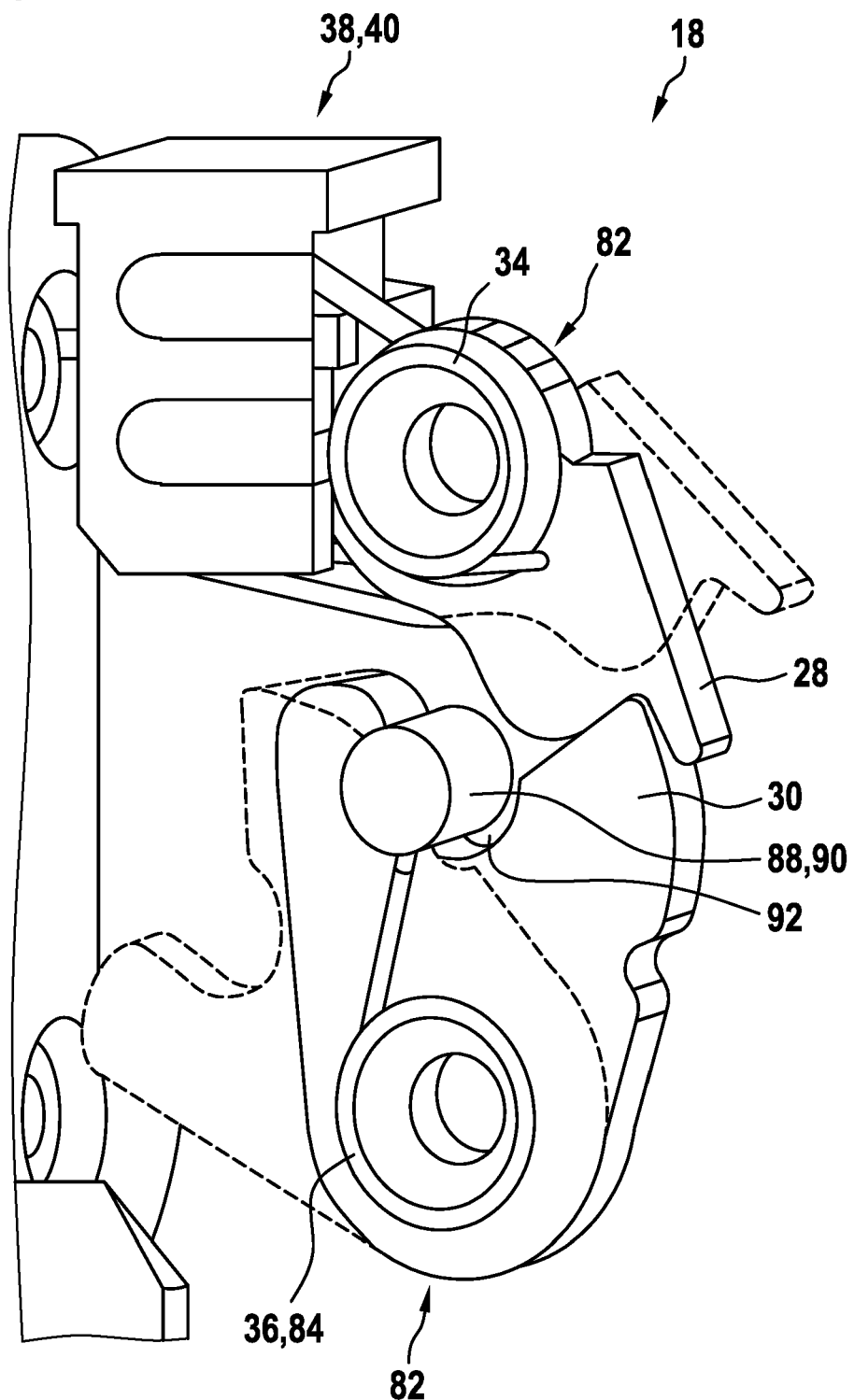
FIG. 5 schematically shows a further representation of one part of the locking unit, in accordance with an example embodiment of the present invention.

FIGS. 4 and 5 show one part of locking unit 18 of holding device 48 in two different schematic views. Locking unit 18 is provided for an axial fixing and releasable locking. Locking unit 18 includes a first locking element 28 and a second locking element 30. Second locking element 30 corresponds to first locking element 28. Locking elements 28, 30 are rotationally mounted at locking unit 18. Locking elements 28, 30 are each shown in two different positions in FIGS. 4 and 5. Locking elements 28, 30 are represented in a first position with a dashed line and show an opened state of locking unit 18. Locking elements 28, 30 are represented in a second position by a solid line and show locking unit 18 in a locking state 32. In locking state 32, first locking element 28 blocks a rotational movement of second locking element 30. In a locking state 32, accumulator 10 is fixed and locked on one side via a locking element 88 situated at accumulator 10, which in the present case is designed as a bolt 90. Locking element 88 of accumulator 10 is in a locking state 32 in a receptacle 92 of locking unit 18. Locking unit 18 includes tensioning unit 82, which is provided to pre-tension locking elements 28, 30 in locking state 32 with the aid of a tensioning force. For this purpose, tensioning unit 82 includes a first tensioning element 34 and a second tensioning element 36. First tensioning element 34 is designed as a rotary spring and is fixedly connected to first locking element 28. In locking state 32, first tensioning element 34 pre-tensions first locking element 28 with the aid of a tensioning force. Second tensioning element 36 is designed as a further rotary spring and is fixedly connected to second locking element 30. In locking state 32, second tensioning element 36 pre-tensions second locking element 30 with the aid of a tensioning force. Locking unit 18 includes actuation unit 26 for an actuation of locking unit 18 by a user without tools. Actuating unit 26 includes actuating element 38. Actuation element 38 is designed as a push-button 40. By actuating push-button 40, first locking element 28 is moved out of locking state 32, as a result of which second locking element 30 subjected to a spring force is moved into an open position. By moving second locking element 30, triggered by an actuation of locking unit 18, in particular, by the actuation of push-button 40, accumulator 10 is ejected. Locking unit 18 includes lock 86. Lock 86 is connected to first locking element 28 in a form-fit manner. Lock 86 forms a securing mechanism of actuation unit 26 for protection against an unauthorized actuation of locking unit 18. In a locked state of lock 86, lock 86 blocks an actuation of actuation element 38. Lock 86 may be unlocked and/or locked with the aid of a key 44. Locking unit 18 may, in particular, otherwise be actuated without tools with the aid of key 44. Locking unit 18 includes a damping element 84. In the present case, second tensioning element 36 is also designed as damping element 84. In locking state 32, second tensioning element 36 designed as damping element 84 exerts a pre-tension and is provided for fixing accumulator 10 in a play-free manner. Alternatively or in addition, damping element 84 could also be designed as a further spring designed differently from second tensioning element 36 designed as a rotary spring or as a rubber element, as a cushion element or as a plate made of foam, such as polyurethane, or a further component suitable for damping and fixing accumulator 10 in a play-free manner.

Figure 6:
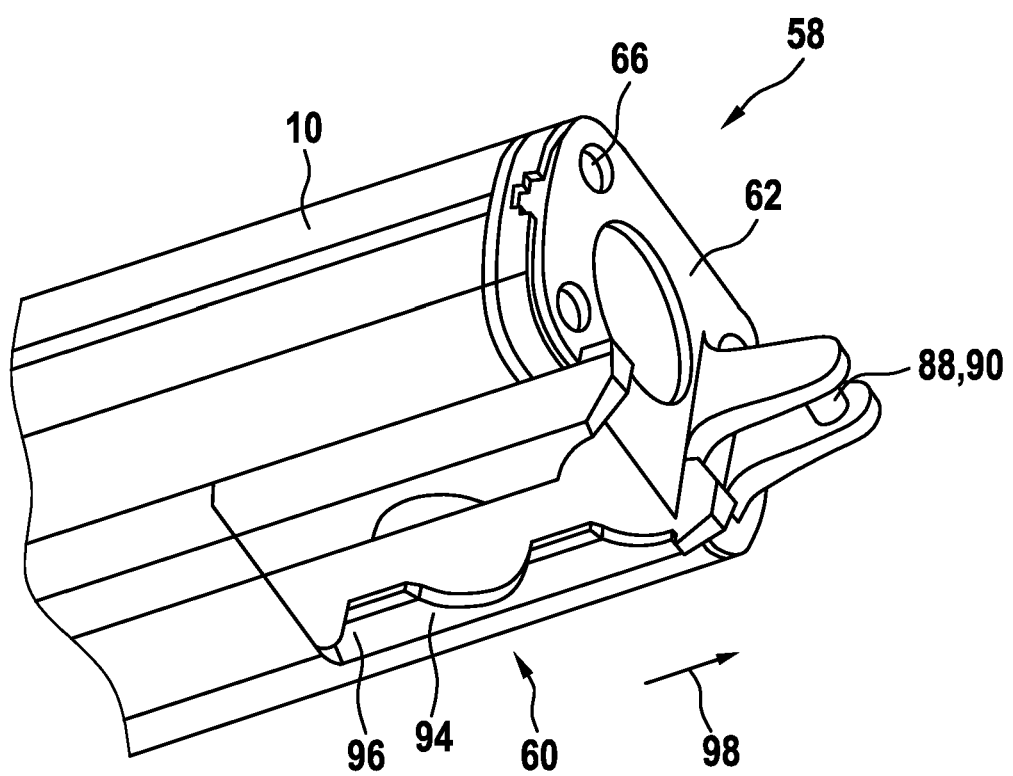
FIG. 6 schematically shows a representation of a fastening unit at the accumulator including an energy store unit, in accordance with an example embodiment of the present invention.

FIG. 6 schematically shows a representation of a fastening unit 58 situated at accumulator 10, which includes a support unit 60. Support unit 60 includes a support bar element 62. Support bar element 62 includes four screw holes 66. Screw holes 66 are used to screw on support bar element 62 at one end of accumulator 10. Support bar element 62 includes three receiving areas 94 for support element 80, which are designed functionally identical to one another. Support bar element 62 includes two support areas 96 for support element 80. Support areas 96 are situated along a longitudinal axis 98 of support bar element 62 adjacent to receiving area 94. Support areas 96 are designed identically to one another. Support area 96 defines a receptacle for support element 80. The support bar element includes locking element 88 which, in the present case, is designed as a bolt 90.

What is claimed is:
1. A holding device for releasably holding an accumulator at a frame, comprising:
at least one carrier unit configured to at least partially receive and/or guide the accumulator; and at least one locking unit is situated at the carrier unit, at least mostly within the frame, for releasably axially fixing the accumulator at the carrier unit on one side,
wherein the locking unit includes at least one first locking element and at least one second locking element and at least one tensioning unit,
wherein the at least one tensioning unit includes a first tensioning element and a second tensioning element, wherein the first tensioning element is fixedly connected to the at least one first locking element, and the second tensioning element is fixedly connected to the at least one second locking element.

2. The holding device as recited in claim 1, wherein the accumulator is a bicycle accumulator and the frame is a bicycle frame.

3. The holding device as recited in claim 1, wherein the locking unit is situated at at least one end of at least one carrier element of the carrier unit, a further end of the carrier element facing away from locking unit being free of a locking element and/or of an axial support element and/or of a stop element.

4. The holding device as recited in claim 1, further comprising:
at least one support unit configured to secure at least one support element, which is situated at one end of the carrier element of the carrier unit facing away from the locking unit, wherein the accumulator at the carrier element, in a state in which the accumulator is situated at the carrier element, extends at least along a direction extending transversely to a longitudinal axis of the carrier element.

5. The holding device as recited in claim 1, further comprising:
at least one electrical interface unit, situated at the carrier unit, configured to electrically contact the accumulator on one side, the at least one electrical unit being situated at the locking unit.

6. The holding device as recited in claim 1, further comprising:
at least one variation unit configured to fix the locking unit at a carrier element of the carrier unit in a position-variable manner.

7. The holding device as recited in claim 1, wherein the locking element includes at least one damping element configured to fix the accumulator in a play-free manner on one side.

8. A holding device, for releasably holding an accumulator at a frame, comprising:
at least one carrier unit configured to at least partially receive and/or guide the accumulator;
at least one locking unit is situated at the carrier unit, at least mostly within the frame, for releasably axially fixing the accumulator at the carrier unit on one side; and
at least one electrical interface unit, situated at the carrier unit, configured to electrically contact the accumulator on one side, the at least one electrical unit being situated at the locking unit,
wherein the locking unit includes at least one tensioning unit,
wherein the at least one electrical interface unit is configured as one piece with the locking unit.

9. A holding device for releasably holding an accumulator at a frame, comprising:
at least one carrier unit configured to at least partially receive and/or guide the accumulator; and
at least one locking unit is situated at the carrier unit, at least mostly within the frame, for releasably axially fixing the accumulator at the carrier unit on one side,
wherein the locking element includes at least one tensioning unit, which is configured to apply a tensioning force to the accumulator in a state in which the accumulator is situated at the locking unit in a direction of the locking unit.

10. A frame including at least one holding device for releasably holding an accumulator at the frame, the holding device including:
at least one carrier unit configured to at least partially receive and/or guide the accumulator; and
at least one locking unit is situated at the carrier unit, at least mostly within the frame, for releasably axially fixing the accumulator at the carrier unit on one side,
wherein the locking unit includes at least one first locking element and at least one second locking element and at least one tensioning unit,
wherein the at least one tensioning unit includes a first tensioning element and a second tensioning element, wherein the first tensioning element is fixedly connected to the at least one first locking element, and the second tensioning element is fixedly connected to the at least one second locking element.

11. The frame as recited in claim 10, wherein the frame is a bicycle frame.

12. The frame as recited in claim 10, including at least one frame tube, in which the holding device is at least mostly situated.

13. A holding device for releasably holding an accumulator at a frame, comprising:
at least one carrier unit configured to at least partially receive and/or guide the accumulator; and
at least one locking unit is situated at the carrier unit, at least mostly within the frame, for releasably axially fixing the accumulator at the carrier unit on one side,
wherein the locking unit is situated at at least one end of at least one carrier element of the carrier unit, a further end of the carrier element facing away from locking unit being free of a locking element and:
(i) of an axial support element and/or
(ii) of a stop element.

* * * * *